UNITED STATES PATENT OFFICE.

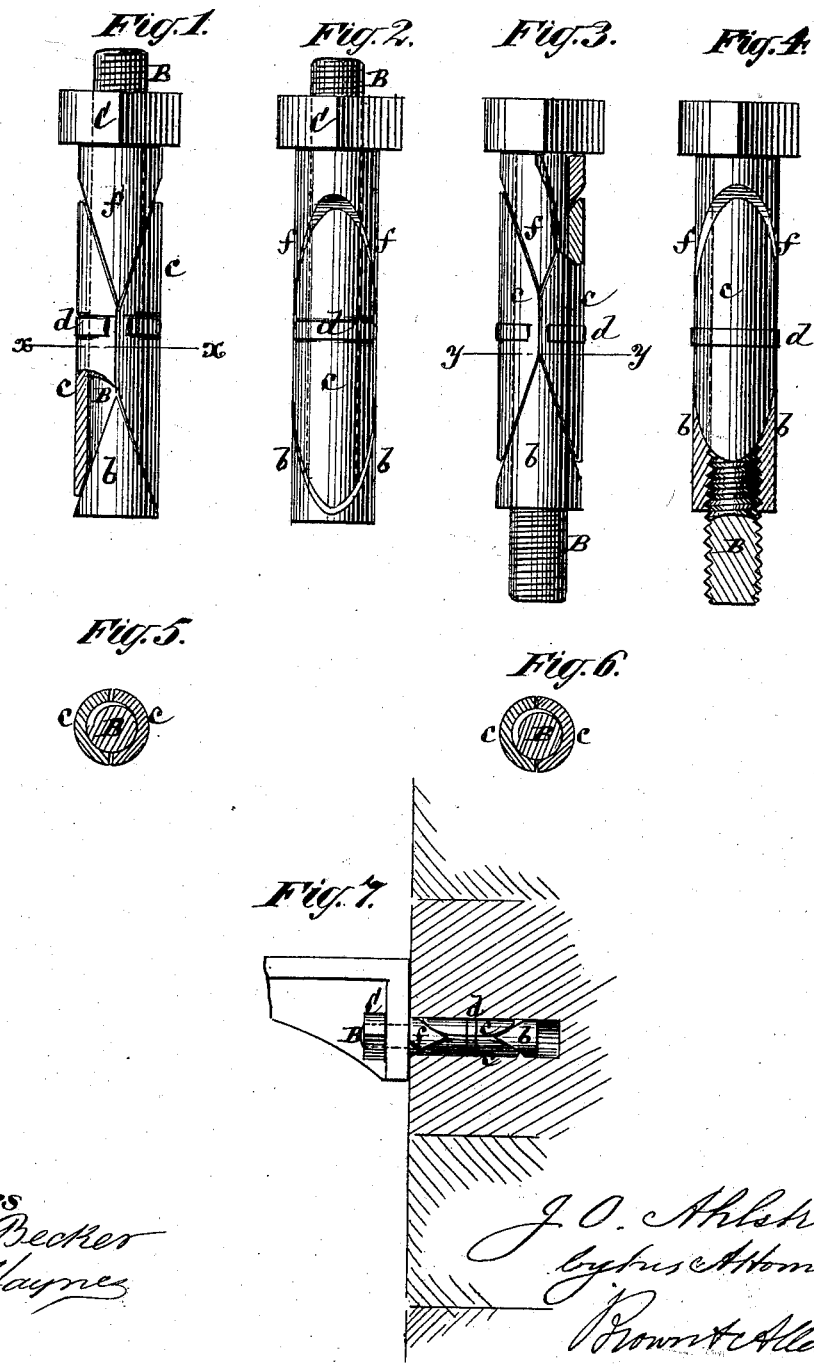

JESPER O. AHLSTROM, OF WILLIAMSBURG, NEW YORK.

IMPROVEMENT IN SCREW-FASTENINGS.

Specification forming part of Letters Patent No. 170,041, dated November 16, 1875; application filed August 30, 1875.

*To all whom it may concern:*

Be it known that I, JESPER OTTO AHLSTROM, of Williamsburg, Brooklyn, in the county of Kings and State of New York, have invented a new and useful Improvement in Screw-Fastenings; and I do hereby declare that the following is a full, clear, and exact description of the same, reference being had to the accompanying drawing, which forms part of this specification.

This invention relates to screw-fastenings applicable to securing brackets or other articles to masonry, and for other purposes, of the kind described in Letters Patent No. 13,177, issued to John London and Otto Ahlstrom, July 3, 1855. In such device a screw-bolt has its head constructed of fixed wedges and loose expanding side pieces, whereby the act of screwing up the nut is caused to expand the said head, for the purpose of making it fit tightly in a suitable cavity or hole, in which it is placed; or, as an equivalent, the nut is constructed with said fixed wedges and expanding side pieces, so that by screwing in the bolt it may, in the same manner, be expanded to fit tightly within the cavity which receives it. Furthermore, an elastic ring serves to keep the expanding side pieces always in a condition to use on the bolt or nut, and allows them to expand when the nut or bolt is screwed up, and to contract when the nut or bolt is unscrewed for the purpose of removal.

My improvement consists in a combination, with the fixed wedges on the bolt-head or nut at the one end of the expanding side pieces, of supplementary and sliding wedges at the opposite end of said side pieces, whereby not only the expanding side pieces are equally expanded throughout their length and at their opposite ends, but whereby either a pull or blow on the screw-fastening in direction of its length will serve to keep the expanding side pieces parallel, and tight as regards their fit within the cavity which receives them, thus rendering the screw-fastening more secure than under the old or former construction, hereinbefore referred to.

Figure 1 represents a partly-broken longitudinal view of my improved screw-fastening, having the fixed wedges applied to the head of the bolt; and Fig. 2, a longitudinal or side view of the same at right angles to the former figure. Figs. 3 and 4 are similar views to Figs. 1 and 2 of the improvement when the fixed wedges are applied to the nut and a part thereof. Fig. 5 is a transverse section on the line $x\,x$, and Fig. 6 a transverse section on the line $y\,y$. Fig. 7 is a view showing the application of the improved screw-fastening, constructed as represented in Figs. 1 and 2, to the securing of a bracket on or against a wall.

Referring, in the first instance, to Figs. 1, 2, and 7 of the drawing, $b\,b$ represent the fixed double wedge fast on the head or one end of the bolt B, and $c\,c$ the loose expansible side pieces, held together by an elastic ring, $d$, so that on screwing up the nut C of the bolt, said side pieces are caused to expand, and to fit tightly within the cavity in the wall or masonry within which they are placed, and so that by unscrewing the nut the expanding side pieces are unloosed to admit of the removal of the fastening, all as hereinbefore described with reference to the patented device of London and Ahlstrom. In that construction, however, so far as described, the force to expand the side pieces $c\,c$ is exerted by the double wedge $b\,b$ at their one end only, which prevents a uniformity of expansion throughout the length of said side pieces, and a blow upon the bolt to force it farther into its cavity relieves the double wedge $b\,b$, and allows of the side pieces contracting, so that the screw-fastening becomes loose. These defects are obviated by providing the bolt at the opposite end of the expansible side pieces $c\,c$ with a free or sliding double wedge or follower, composed of wedges $ff$, which enter within the expansible side pieces $c\,c$ at the outer or opposite end of the latter to the fit of the double wedge $b\,b$, so that not only on screwing up the nut C will the expansible side pieces $c\,c$ be forced out equally from both ends, but so that either a pull or blow on the screw-fastening in direction of its length will serve to tighten the expansible side pieces, or to keep them taut within the cavity in which they fit, and to preserve the parallelism of the side pieces throughout their entire length, the double wedge $ff$ acting as a follower to produce such effect.

The same effect or effects are produced when the fixed double wedge $b\,b$ is applied to the nut, as in Figs. 3 and 4, in which B also represents the bolt, that may have a common head; $c\,c$, the expansible side pieces; $d$, the elastic holding-ring, and $f f$ the supplementary and free double wedge or follower at the opposite end of the expansible side pieces to that within which the double wedge $b\,b$ of the nut fits.

I claim—

The combination of the supplementary and free double wedge or follower $f f$ with the double wedge $b$, the expansible side pieces $c\,c$, and the bolt B, substantially as specified.

JESPER OTTO AHLSTROM.

Witnesses:
BENJAMIN W. HOFFMAN,
FRED. HAYNES.